Dec. 10, 1957 D. C. THOMAS ET AL 2,816,159

ELECTRONIC DISPLAY SYSTEM WITH PHASE CHANGING
NON-LINEAR OUTPUT AMPLIFIER

Filed Jan. 11, 1952

Inventors:
David C. Thomas,
Desmond Hunter,
by Merton D. Morse
Their Attorney.

United States Patent Office 2,816,159

Patented Dec. 10, 1957

2,816,159

ELECTRONIC DISPLAY SYSTEM WITH PHASE CHANGING NON-LINEAR OUTPUT AMPLIFIER

David C. Thomas, Rugby, and Desmond Hunter, Bilton, England, assignors to General Electric Company, a corporation of New York Application January 11, 1952, Serial No. 266,038

Claims priority, application Great Britain February 20, 1951

8 Claims. (Cl. 178—6.8)

Figures 1, 2:
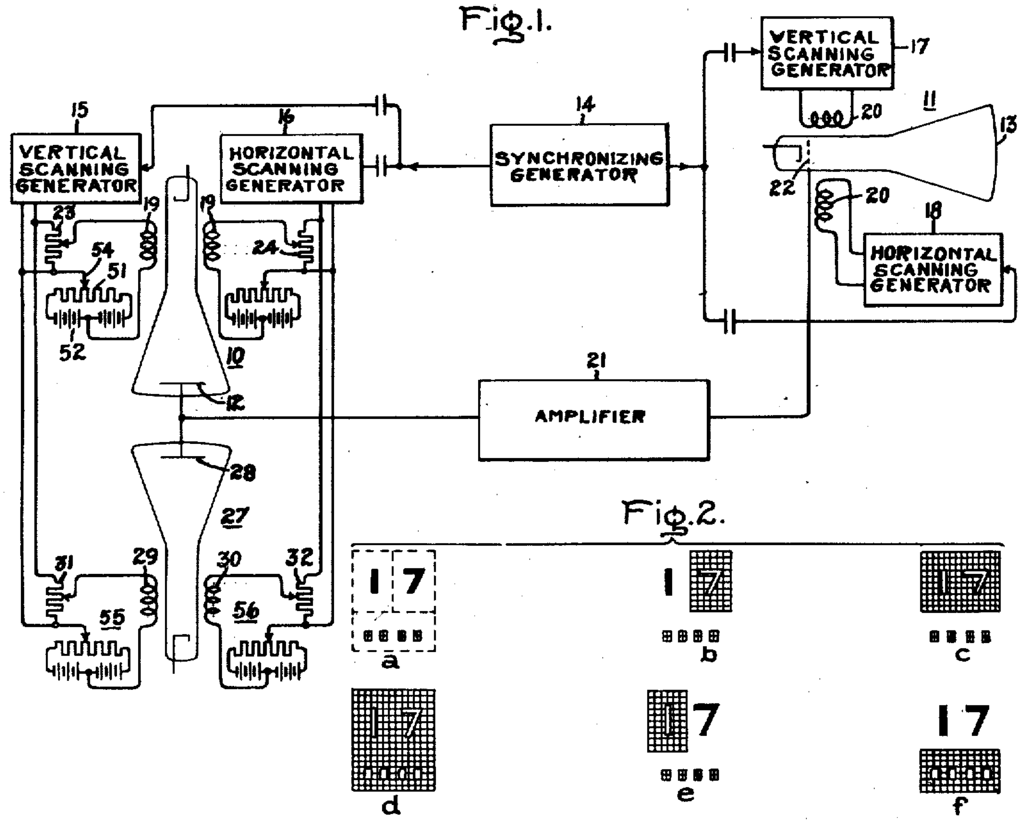

This invention relates to systems for displaying information in coded form by electronic means.

In particular, the invention is concerned with a system involving the use of cathode-ray tubes of the kind adapted, when the electron beams thereof are suitably scanned, to generate a varying signal voltage corresponding to an image formed on a signal plate or screen within the tube, or to a similar signal-generating system. Hereinafter, reference is made, for the sake of brevity, to a tube or system of this character by the term monoscope, but it is to be understood that this term is not intended to be taken in the limitative sense, but is to apply generically to tubes or systems capable of producing an image signal corresponding to an optical or other image displayed on a screen within the tube or signal-generating plate externally of the tube. A system known as a flying-spot scanner is also representative of a suitable device.

It has been suggested heretofore to transmit information in code and render it visible at a remote point on the screen of a cathode-ray tube by a system similar to that involved in television using a monoscope at the transmitter. In this known system, a predetermined pattern is present on the signal plate of the monoscope so that, when the pattern is scanned, the image signal produced, when transmitted and applied to the receiving cathode-ray tube, the screen of which is similarly scanned, causes the predetermined pattern to be reproduced on its screen. If the scanning of the beam of the cathode-ray tube is effected in a manner which differs in a predetermined fashion from the scanning of the monoscope, the pattern reproduced on the screen of the cathode ray tube can be made to differ in given respects from that on the screen of the monoscope. Thus, the proportions of the reproduced pattern can be varied, or a selected part only of the pattern can be displayed and at any part of the screen of the cathode-ray tube.

In general, a code relying on such changes in the predetermined pattern is not capable of conveying much information or information that is easily recognizable. Consequently, in order to vary the pattern transmitted and thereby to convey the coded information desired, if a single monoscope tube is incapable of accommodating a variety of patterns from which it is desired to make the coded selection, two or more monoscope tubes can be employed alternatively or simultaneously.

It is, therefore, an object of the present invention to provide a coded display system of the kind involving a monoscope and a cathode-ray tube, and having means for increasing the information displayed by a given pattern.

According to the invention the image signal obtained from the monoscope tube is mixed with the signal obtained from a second cathode-ray tube also of the monoscope type, the combined signal being passed through an amplifying channel possessing a characteristic such as to invert the sense of the image-signal voltage from the first monoscope tube when a signal voltage of a predetermined value is derived from the second monoscope tube.

Another object of this invention is to provide novel amplifier apparatus which is characterized in that means are provided for automatically reversing the polarity of the output signal in response to input signals in excess of a predetermined amplitude.

In accordance with the present invention, it is possible, assuming the original pattern on the screen of the first monoscope tube to consist of a character, or characters, in white on a black background, to invert, at will, the whole or part of the image reproduced on the screen of the cathode-ray tube so that the original character or part of it is displayed in black on a white background. Thus, according to the part of the pattern displayed on the screen of the first monoscope tube which is inverted, the information displayed by the pattern reproduced on the screen of the cathode-ray tube can be increased.

In carrying out the invention it is, in general, convenient to effect the scanning on the first monoscope tube and the cathode-ray reproducing tube to the same scheme so that, in the absence of the control signal provided by the second monoscope tube, the pattern is reproduced substantially in its original proportions on the screen of the cathode-ray tube. In the arrangement of the invention, the beam of the second or shading monoscope tube, so called, is preferably scanned in a path similar to that adopted for the first monoscope and the cathode-ray tubes. The pattern provided on the screen of the main monoscope tube is preferably one divisible into rectangular or other convenient sections, the scanning being confined to one or more of the sections, and the selection of the section or sections to be scanned is made by supplying suitable bias to the scanning means employed.

The shading monoscope is provided with a pattern consisting of a plain rectangle in black on white or vice versa; thus, when both monoscopes are scanned and the signal obtained from the shading monoscope is added to that of the first monoscope, a total signal amplitude is obtained which, when impressed on the amplifying channel, yields the required inversion of the original pattern. It will be understood that the whole pattern on the main monoscope can be inverted or, by suitable control of the scanning of the shading monoscope, only a portion of that pattern is inverted. Furthermore, scanning of the main monoscope can be restricted to a part only of the pattern, if desired, or to a part only of the scanned pattern can be inverted.

Figure 3D:
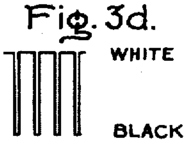
Figure 3E:
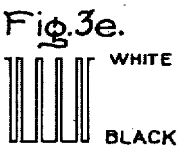
Figure 4:
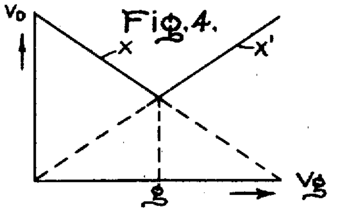
Figure 5:
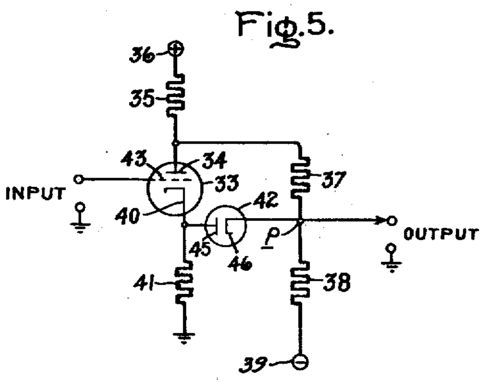

These and other objects and features of this invention may be noted in greater detail in the following description wherein reference is made, by way of example, to the drawings in which:

Fig. 1 is a circuit diagram, partly in block diagrammatic form, illustrating an arrangement embodying the invention; Fig. 2*a* shows a representative pattern which may be employed on the screen of the main monoscope; Figs. 2*b* through 2*f* illustrate various modifications of the pattern indication that can be effected by the arrangement of Fig. 1; Figs. 3*a* through 3*e* show illustrative waveforms of the signals developed at different points in the arrangement; Fig. 4 is a graph of the characteristic of the amplifier employed in the arrangement; and Fig. 5 is a circuit diagram of an amplifier that may be used in carrying out the invention.

Referring to Fig. 1, a system for transmitting coding information is illustrated comprising a main monoscope tube 10 at a transmitting station and a receiving cathode-ray tube 11 at a remote point. The monoscope tube 10 may be of any suitable design known in the art and is provided with the usual beam-forming and beam-deflecting means and includes a signal plate 12 on which is displayed an optical or other image in the form of a pattern which gives the desired coded information. The cathode-ray tube 11 is also of conventional design and is provided with a screen 13 on which is displayed the transmitted coded information. Means including a synchronizing-signal generator 14 are provided for synchronously scanning the cathode beams in the tubes 10, 11 in a predetermined fashion, generally in the form of a raster. The synchronizing signal generator 14 supplies synchronization-signal inputs to vertical and horizontal scanning-wave generators 15 and 16 for the tube 10 and to similar vertical and horizontal scanning wave generators 17 and 18 for tube 11. The generators 15—18 are provided, as is well known, with suitable amplifier stages, of which the outputs are applied to beam-deflection coils 19 and 20 of the tubes 10 and 11, respectively.

As noted above, a common raster is conveyed to the monoscope 10 and to the cathode-ray tube 11, and when the signal plate 12 of monoscope 10 is scanned, an image signal is generated which, after amplification by an amplifier 21, is impressed on a modulation electrode 22 of the cathode-ray tube 11, thereby to reproduce on the screen 13 the pattern on the signal plate 12.

Fig. 2*a* illustrates a type of code pattern that can be formed on the plate 12. Such a pattern may consist of the numerals 1 and 7 in black on a white background and underneath a row of four dots also in black on a white background. Other suitable patterns may be provided, as desired, the illustrated pattern being exemplary only. The scanning may be confined to one or more of a plurality of small rectangular or other suitable sections of the signal plate 12, as indicated by the broken lines dividing the pattern into a convenient number of rectangles, here shown as three. The scanning voltages or currents can be suitably adjusted to control the amplitude of scan as by resistance voltage dividers 23, 24 in the input terminals of the coils 19 of the monoscope 10. If a suitable bias arrangement is also provided and the bias is adjusted, it is then possible to reproduce on the screen 13 any selected section of the pattern on the plate 12, and in a corresponding position on the screen. A bias arrangement that can be used may comprise, for example, a potentiometer consisting of a resistance 51 connected across a standard D. C. voltage source 52, the center tap of which is connected directly to one terminal of the coil 19 while a slider 54 movable over resistance 51 is connected directly to one side of the voltage divider 23. It will be apparent to those skilled in the art that other forms of bias-control arrangements can be employed for the same purpose. The scanning-amplitude and bias-control arrangements for the horizontal deflection coil of the monoscope 10 may be of the same type as described hereinabove in connection with the vertical deflection coil.

Thus, it will be seen that a selected section of the pattern at Fig. 2*a* can be given, to an enlarged scale, on the screen 13 by suitable adjustment of the scanning voltages or currents. For example, the scanning on the monoscope can be confined to but one rectangle while that on the receiving tube is maintained normal to provide on the screen 13 an enlargement of the scanned portion of the signal plate 12.

The foregoing features of the monoscope-tube circuit are well known. A typical conventional arrangement that can be used for the parts heretofore described is shown and described in Principles of Television Engineering by D. G. Fink, McGraw-Hill Book Company, Inc., New York, first edition, 1940, pp. 496, 497, to which reference is made for a fuller description thereof. It is to be understood, further, that although the transmission between the monoscope 10 and the remote cathode-ray tube 11 is here shown as by a direct-wire connection, the transmission will generally embody a radio link if the distance or circumstances render this necessary.

To increase the range of pattern variations that can be transmitted for a given pattern on plate 12, a shading monoscope 27 generally similar to the monoscope 10 is employed having its signal plate 28 connected to the signal plate 12 of monoscope 10. Thus, any signals generated in the monoscope 27 will be added to those generated by the monoscope 10 and transmitted by way of amplifier 21 to the cathode-ray tube 11. The scanning voltages for the shading monoscope 27 can be obtained from the output of the generators 15, 16, and in order that the scanning can be controlled to add a signal obtained from specified parts only of the signal-generating plate 28, there are provided voltage dividers, indicated at 31 and 32, for controlling the amplitude of scan, and bias control means 55, 56 for controlling the position of scan, each of which may be of the same type as previously described in connection with the monoscope 10.

According to a particular feature of the invention, the amplifier 21, to be described in detail hereinbelow, desirably possesses a characteristic such that, when the combined signal from the signal-generating plates 12 and 28 exceeds a given amplitude, the signal impressed on the modulation electrode 22 of the cathode-ray tube 11 is such as to invert the sense of the signal. In this manner, a positive-going signal is converted into a negative-going signal, thus producing, on the screen 13, an image which is the inversion of the pattern originally present on the signal plate 12.

In the operation of our system, and assuming the signal from the signal plate 12 only is transmitted, there will appear on the cathode-ray tube 13 a pattern similar to that shown in Fig. 2*a*. This may convey a given information in one code. By adding a signal from the shading monoscope 27, it is possible to transmit and indicate a pattern corresponding to those illustrated at *b*, *c*, *d*, *e* or *f* of Fig. 2 by suitable changes in the signal provided by the shading monoscope 27, thus conveying additional easily recognizable information according to a predetermined code.

This result may be achieved by providing, on the signal plate 28, a pattern in the form of a rectangle in white on a black background, which rectangle is desirably of smaller area than the raster so that the size and position thereof relative its raster may conveniently be varied by adjustment of the amplitude and position controls 30, 31 and 55, 56, respectively. When the signal plate 28 is suitably scanned, so that white rectangle assumes a position with respect to the scanning raster on the plate 28 of the shading monoscope 27 corresponding to the selected part of the pattern on plate 12 on the main monoscope 10, say the upper left rectangle containing the numeral 1 (Fig. 2*a*), a signal corresponding to that part alone is added to the signal derived from plate 12 to provide a composite signal to be amplified in amplifier 21. By so controlling the scanning of the shading monoscope 27, the pattern conveyed by the added signal is reproduced on the screen 13 in the manner shown in the form of the shaded upper left rectangle indicated in Fig. 2*e*.

Figures 3A, 3B, 3C:
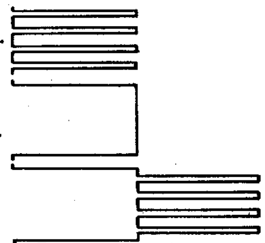

Similarly, the relative position of the white rectangle on plate 28 can be shifted, by control of bias, and/or changed in size, by control of amplitude of scan, to occupy other relative positions, as desired, so that the resultant indication is as indicated at Figs. 2*b*, 2*c*, 2*d* and 2*f*. And, in general, it will be seen that if the signal generated by the signal plate 12 is that represented at Fig. 3*a*, and the shading signal produced by the scanning of the plate 28 is that represented at Fig. 3*b*, the combined coding and shading signal applied to the input of the amplifier 21 is as represented at Fig. 3*c*.

The characteristic of the amplifier 21, by virtue of which the above-described operation of our system is obtained, is indicated in Fig. 4. Thus, for a given increase in grid voltage, $V_g$, the output voltage $V_o$ decreases according to the straight-line characteristic X. The amplifier is so arranged that at a predetermined grid voltage *g*, the output voltage rises with increasing grid voltage according to the straight-line characteristic X′. Thus, for an input signal as at Fig. 3*a*, an output signal of the form shown at Fig. 3*d* is derived, indicating a positive or white-on-black display of the image on plate 12, while for the combined coding and shading signal indicated at Fig. 3c, the output signal *e* in Fig. 3 is produced, indicating a negative or black-on-white display. The pattern has thus been inverted by the addition of the predetermined signal voltage arising from the shading monoscope.

Fig. 5 illustrates an amplifier circuit that possesses the above-described desirable characteristic. The amplifier consists of a device 33 which, although shown as a triode, may, if desired, consist of a device of the pentode type. The device 33 is arranged to provide an output voltage that is opposite in phase with respect to the input voltage over a part of its operating range, and an output voltage in phase with the input voltage over the remainder of the range. We have termed this type of output voltage characteristic a phase-variable output voltage, and to effect such operation, the device 33 has its anode 34 connected through an anode resistance 35 to a source of positive potential 36 and through serially-connected resistors 37 and 38 to a source of negative potential 39 of substantially the same magnitude as the source 36. Cathode 40 of the device 33 is grounded through a cathode resistor 41. The resistors 37, 38 are desirably of considerably greater magnitude than resistor 35 or 41. Connected between the cathode 40 and a point *p* at the junction of the resistors 37 and 38 is a device, indicated as a diode 42 but which may consist of any suitable unilaterally conductive element. The anode 45 of diode 42 is connected directly to the cathode 40 of device 33 and the cathode 46 is directly connected to the junction point *p*. A grid 43 of device 33 forms the input terminal of the circuit and is connected to receive signals from the plates 12, 28 of the monoscopes 10, 27. The output voltage is taken between the point *p* to ground.

In operation, and for relatively small positive voltages applied to the grid 43 of device 33, there is obtained the normal output voltage-grid voltage characteristic X. When, however, the grid voltage exceeds a value *g*, diode 42 commences to conduct, after which the potential of the cathode and that at point *p* are maintained substantially equal and the characteristic changes to that indicated by the portion X′.

The operation to provide the phase-variable output may readily be understood in the light of the following considerations. With the device 33 at cutoff, no plate current is drawn and, since the current in resistor 41 is zero, the cathode 40 is at ground potential. Now, if resistance 38 is larger than the sum of resistances 37 and 35, point *p* is at a potential above ground. Therefore, under these conditions diode 42 is nonconducting. As $V_g$ is made more positive, the potential at the cathode 40 rises above ground as the device 33 draws current, and the potential at *p* falls because of the increasing drop in potential across the anode resistor 35. As thus far described, the amplifier operates in substantially conventional manner, and it can be shown the output voltage varies with the applied grid voltage in accordance with the negative-slope part X of the characteristic shown in Fig. 4.

However, as the voltage $V_g$ applied to the grid 43 is increased, a point is reached at which the diode 42 becomes conductive. Beyond this point, the conducting diode may be considered essentially as a short circuit and the potential of *p* is substantially the same as the cathode potential.

Now, since resistors 37 and 38 are large compared to cathode resistor 41 and anode resistor 35, the currents through resistors 37 and 38 are small as compared to the tube current. Hence, the tube now operates essentially with unity gain, or the output voltage $V_o$ follows the input voltage $V_g$ in accordance with the positive-slope portion X′ of the characteristic. Thus, the phase of the output potential at point *p* with respect to the input potential is reversed. This behavior of the amplifier, as above described, gives the inversion of the pattern displayed on the screen of the cathode-ray tube.

While the present invention has been described by reference to a particular embodiment thereof, it is to be understood that numerous modifications may be made by those skilled in the art without departing from the essence of our invention. We, therefore, aim in the appended claims to cover all such equivalent variations as come within the true spirit and scope of the foregoing disclosure.

What we claim as new and desire to secure by Letters Patent of the United States is:

1. In apparatus for remote indication of intelligence and including means to generate a signal corresponding to a predetermined intelligence pattern and indicating means responsive to said signal normally to provide a characteristic indication of said pattern, the combination with said generating means of cathode-ray scanning means connected to provide a signal inadditive relation to said generated signal, and signal translating means having an output voltage which varies with input voltage in one direction on one side of and in another direction on the other side of a predetermined value of input voltage, said means being responsive to summation of said signals whereby the character of said indication is altered when said predetermined value of input voltage is exceeded.

2. In an apparatus for indicating intelligence at a remote point including cathode-ray scanning means to generate a signal corresponding to a predetermined intelligence pattern and cathode-ray indicating means responsive to said signal normally to provide positive indication of said pattern, the combination with said scanning means of second cathode-ray scanning means connected to provide a signal in additive relation to said generated signal, and non-linear amplifier means having an output voltage which varies directly with input voltage over one range and inversely with input voltage over another range, said non-linear amplifier means being responsive to the sum of said generated and added signals to provide a resultant signal having a sense characteristic opposed to that of said generated signal when said sum exceeds a predetermined value.

3. A remote indicating apparatus comprising first cathode-ray scanning means to generate a code signal corresponding to a predetermined intelligence pattern scanned by the electron beam of said scanning means, cathode-ray indicating means synchronously responsive to said signal for providing a positive indication of said pattern, second cathode-ray scanning means having means to generate a signal corresponding to the scanning of the beam thereof across a selected part of a reference pattern, said second scanning means being connected to add the signal thereof to said generated signal, thereby to provide a resultant signal having an increased-amplitude part corresponding to the part of said reference pattern scanned by said second scanning means, and means having an output which varies directly with input voltage over one range and inversely with input voltage over another range, said means being connected to said cathode-ray indicating means and responsive to said increased-amplitude part of said resultant signal to change said positive indication in a region corresponding to said selected scanned part.

4. A system for transmitting coded intelligence, comprising a first cathode-ray tube having a code plate disposed to be scanned by the electron beam thereof, means to cause said beam to scan said plate to generate a signal corresponding to said code, a second cathode-ray tube having a plate disposed to be scanned by the beam of said second tube in synchronism with the scan of said first tube to provide a shading signal, means combining said shading signal in additive relation to said generated signal, cathode-ray indicating means responsive to a resultant signal for providing a visual image, and phase-changing means responsive to the sum of said generated and added signals to provide to said cathode-ray indicating means said resultant signal having a sense characteristic opposed to that of said generated signal when sum of said generated and added signals exceeds a predetermined value, whereby predetermined parts of said image are presented in reversed phase.

5. Apparatus for displaying information in code, comprising a monoscope device having a plate element on which is carried a pattern, means to derive a signal from said monoscope corresponding to said pattern, a shading monoscope having a plate element on which is carried a reference pattern and including means to derive a signal corresponding to said reference pattern, means for mixing the signals from said monoscope and said shading monoscope, said mixing means including a phase-changing amplifier adapted to invert the sense of the mixed signal in response to the occurrence of a mixed-signal voltage exceeding a predetermined magnitude.

6. Apparatus for displaying information in code, comprising a monoscope having a first signal plate on which is mounted a predetermined code pattern and means to derive a signal voltage corresponding to said pattern, a cathode-ray device having a screen and means to effect reproduction on said screen of a selected part of said pattern, means to adjust the origins of the scanning rasters of said first monoscope and said cathode-ray device, whereby a selected part only of said pattern is displayed at a portion of said screen, second monoscope means for augmenting the signal voltage from said first monoscope, and a phase-changing amplifier responsive to said augmented signal and adapted to invert the sense of said augmented signal when the augmented signal exceeds a predetermined voltage level, said phase-changing amplifier being so connected as to feed its output to said cathode-ray device.

7. The apparatus as defined in claim 6, wherein the pattern is in black on white, and the signal from said phase-changing amplifier is adapted, at selected parts of said reproduced pattern to change said reproduced pattern to white on black.

8. The apparatus as in claim 6, further comprising means to vary the dimensions of the pattern reproduced on said cathode-ray screen.

References Cited in the file of this patent

UNITED STATES PATENTS

| | | |
|---|---|---|
| 1,877,165 | Francis | Sept. 13, 1932 |
| 2,213,178 | Iams | Aug. 27, 1940 |
| 2,224,794 | Montgomery | Dec. 10, 1940 |
| 2,244,239 | Blumlein et al. | June 3, 1941 |
| 2,275,017 | McNaney | Mar. 3, 1942 |
| 2,293,899 | Hanson | Aug. 25, 1942 |
| 2,611,819 | Serrell | Sept. 23, 1952 |
| 2,613,263 | Hilburn | Oct. 7, 1952 |

FOREIGN PATENTS

| | | |
|---|---|---|
| 525,791 | Great Britain | Sept. 4, 1940 |

UNITED STATES PATENT OFFICE

CERTIFICATE OF CORRECTION

Patent No. 2,816,159 December 10, 1957

David C. Thomas et al.

It is hereby certified that error appears in the printed specification of the above numbered patent requiring correction and that the said Letters Patent should read as corrected below.

Column 7, line 16, before "monoscope" insert -- first --; same line 16, for "having a first signal" read -- having a signal --.

Signed and sealed this 11th day of February 1958.

(SEAL)
Attest:

KARL H. AXLINE
Attesting Officer

ROBERT C. WATSON
Commissioner of Patents